UNITED STATES PATENT OFFICE.

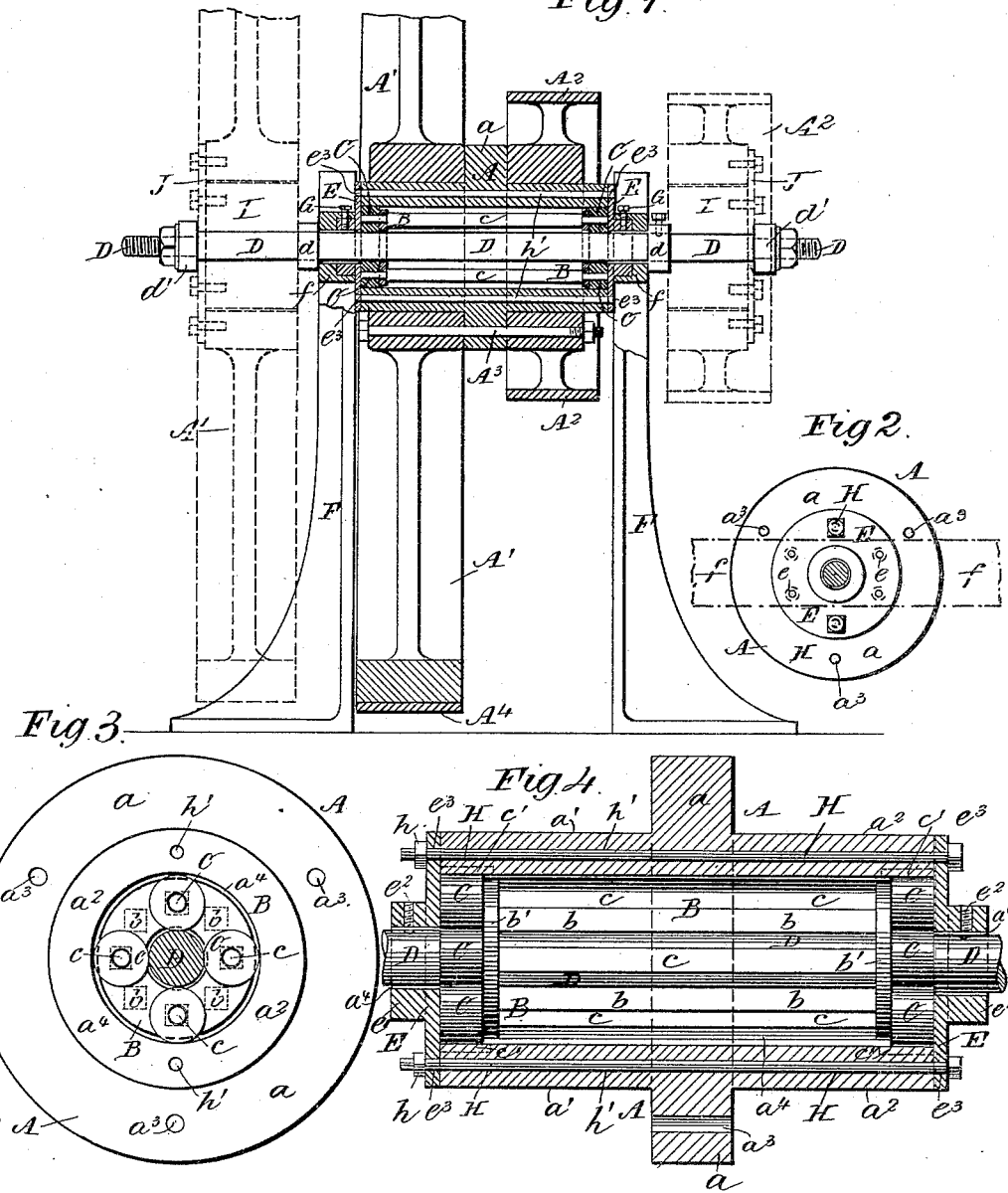

DAVID C. FRAZEUR AND WILLIAM J. DAVIS, OF NEW MARKET, NEW JERSEY.

WHEEL OR PULLEY.

SPECIFICATION forming part of Letters Patent No. 436,409, dated September 16, 1890.

Application filed November 5, 1889. Serial No. 329,304. (No model.)

*To all whom it may concern:*

Be it known that we, DAVID C. FRAZEUR and WILLIAM J. DAVIS, of New Market, in the county of Middlesex and State of New Jersey, have invented a new and Improved Wheel or Pulley, of which the following is a full, clear, and exact description.

Our invention relates to wheels and pulleys, and more particularly when applied in power-transmitting mechanisms.

The invention has for its object to minimize friction in the transmission of power, thereby promoting efficient performance of work with economy of fuel, time, and labor.

The invention consists in certain novel features of construction and combinations of parts of the wheel and pulley mechanism, all as hereinafter described and claimed.

Reference is to be had to the accompanying drawings, forming a part of this specification, in which similar letters of reference indicate corresponding parts in all the figures.

Figure 1 is a vertical sectional elevation illustrating our improvement as applied to use in two ways for the transmission of power. Fig. 2 is a side or face view of the wheel or pulley hub with the shaft or axle in cross-section and the end cap-plate applied. Fig. 3 is an enlarged side view of the wheel or pulley hub with the cap-plate removed to show the free-running anti-friction endless roller-chain bearing of the hub, the shaft or axle being in cross-section; and Fig. 4 is a longitudinal sectional elevation of the hub and shaft and attached end cap-plates.

In the drawings the hub portion A of the compound driving or power-transmitting wheel is made with an exterior central flange portion $a$, having cylindrical bearing surfaces $a'$ $a^2$, onto which, respectively, are or may be fitted the hub portions of a main fly-wheel A' and a power-transmitting pulley $A^2$, which when thus applied are secured to the hub A and to each other by a series of three or more bolts $A^3$, which pass through the wheel A', the hub-flange $a$, and the pulley $A^2$, the flange having holes $a^3$ made to receive said bolts.

Within the somewhat large central interior bore $a^4$ of the hub A is placed loosely a frame B, to which are journaled series of anti-friction rollers or wheels C, which when the hub is made of metal run directly upon the wall of the hub-bore; but when the hub is made mainly of wood the anti-friction rollers will run upon metal wear-plate rings $c'$ set into it, as indicated in dotted lines in Fig. 4 of the drawings. This roller-frame B C rests by its rollers directly upon the wheel shaft or axle D, which runs loosely through end bearings E E, which consist of metal plates which are fastened by bolts or screws $e$, or otherwise, to horizontal bars $f f$ of a suitable frame F, supporting the entire power-transmitting mechanism.

The roller-frame B consists of two end plates $b'$ $b'$, in which are fixed a number of metal bars or rods $b$—say four—and between which in the end plates are fitted or journaled a series—say four—of shafts or axle-rods $c$, onto the reduced rounded ends of which the rollers C are journaled, one set of four at each end of the frame, and preferably outside the end plates $b'$ thereof. There may be but three rollers C at each end of the frame B, or more than four, as the size of the wheel or pulley or the work it is to do may require. When the frame B, with its rollers C, is slipped into the bore $a^4$ of the hub A of the wheel or pulley, and the shaft or axle D is slipped in between or within the circles or endless chains of anti-friction rollers C C, and the end bearing-plates E E are slipped onto the shaft and up against the ends of the wheel-hub A to hold the rollers C C in place, the shaft will then be set into suitable openings or recesses provided for it in the frame F, to which frame the bearing-plates E E will then be securely fastened by the bolts or screws $e$. Outside the frame-bars $f f$ the shaft is provided with collars $d d$, one of which may be fixed and the other loose and fastened by a set-screw, or both collars may be loose and be held by set-screws, as preferred.

The end cap-bearing and roller-retaining plates E are each preferably provided with an outwardly-extending central boss $e'$, which is fitted into the frame-bar $f$, and has a threaded hole $e^2$, which receives a set-screw G, which may be passed in through the bar $f$ and set onto or into the shaft D to prevent turning of the shaft when the hub A and the wheel and pulley A' $A^2$ it carries are to turn on the roller-frame B C and said frame is to turn on the shaft; but when the hub A is to remain at rest and the shaft D is to turn in the roller-frame B C, while allowing this frame to turn also in the hub, the set-screws G G will be removed or turned back from the shaft, and bolts H H will be run through holes $e^3 e^3$ in the end plates E E and holes $h' h'$ made through the hub A, and when the nuts $h h$ of these bolts are tightened the hub A will be held stationary, as it then will be secured to the hub end plates E E, which are themselves bolted to the frame, as above described. In this latter adjustment the balance-wheel A' and pulley $A^2$ will be removed from the hub A and will be placed one at each end of the shaft D, and to permit this we have provided blocks I I, which fit snugly into the central openings or bores of the wheel and pulley which are fitted to the main hub-bearings $a'$ $a^2$, and these blocks have central holes which fit nicely upon the shaft or axle. Metal plates J, bored to fit the axle, are placed thereon outside of the wheel and pulley and their center blocks I, and are bolted both to the wheel and pulley and to the blocks to hold the wheel and pulley on the shaft at true centers, and nuts $d' d'$ are screwed onto the ends of the shaft to hold the pulley and wheel in place. (See the dotted lines in Fig. 1 of the drawings.)

The operation is as follows: When the bolts H H are not applied to the hub A and plates E E, and the balance-wheel A' and pulley $A^2$ are secured by the bolts $A^3$ to the hub A, and the shaft D is secured by the set-screws G G, it is manifest that when a driving-belt $A^4$, leading from any convenient prime motor, is operated the hub A will turn freely around between the fixed end plates E E, and consequently the pulley $A^2$ will be rotated, and by means of a belt or any suitable gearing fitted to it may be made to transmit power to any adjacent sawing, thrashing, or other machinery. When operated in this manner it is obvious that while the main hub A turns very freely upon and around the endless frame or chain of anti-friction rollers B C by bearing on the rollers C, this frame or endless chain of rollers also is free to turn around and upon the relatively-stationary shaft or axle D, and usually while the hub A is making two turns around and on the endless chain of rollers C the latter makes one turn around the shaft or axle, and the rotary motion of the entire mechanism is so greatly relieved of friction that the power applied is economized very largely when transmitted to the driving-pulley and thence to the work to be done. When it is desired to rotate the shaft or axle D and apply the power to and from it, the wheel and pulley A' $A^2$ will be taken from the hub A, and by the aid of the blocks I and bolted plates J and nuts $d'$ will be mounted on opposite ends of the shaft or axle, as shown in dotted lines in Fig. 1 of the drawings, and after the bolts or screws G G are turned back to free the shaft D and the bolts H H are applied through the hub A and its fixed end plates E E, as shown in Fig. 4 of the drawing, to hold the hub stationary, the belt $A^4$, when applied to the balance-wheel A' and operated, will turn the shaft or axle D and the pulley $A^2$ to drive machinery from the latter. In this case it is manifest that while the shaft is free to turn easily in the endless frame or chain of rollers B C and bears directly on the rollers the roller-frame is also free to rotate in the fixed hub $A^2$, and usually the shaft or axle will make about four revolutions in the roller-frame while the frame makes one revolution in the hub. When operated in this manner the friction is also materially lessened and power is economized.

It is manifest that, however the power-transmitting mechanism may be used, the strain of the work performed is taken not on one point or place at and along the bore of the hub, but at opposite sides of the bore or all around it, whereby durability of the parts is assured. If desired, a power-transmitting belt may also be applied to the hub-flange $a$, between the wheel and pulley A' $A^2$, and lead thence to a machine to be operated.

It will be understood that what we herein call the "end plates" E, which are used at opposite ends of the power-wheel hub, and are preferably made of metal and fixed to the machine-frame F, may be substituted by adjacent side parts of said frame covering the ends of the wheel-hub, either construction being the full equivalent of the other. In other words, the end plates may be separate from and fixed to the frame, or may be parts of the frame itself.

Having thus described our invention, what we claim as new, and desire to secure by Letters Patent, is—

1. In a wheel or pulley power mechanism, the combination, with a supporting-frame, of a bored hub, an interior shaft or axle placed loosely therein, an endless chain of rollers placed between the shaft and the wall of the hub-bore, end plates for the hub secured to the frame, and bolts adapted to the hub and end plates, substantially as described, whereby the hub may be left loose between the end plates and the axle may be fastened to allow the hub to turn on the endless chain of rollers while they turn on the shaft, or the hub may be fixed to the end plates and frame to allow the shaft or axle to turn freely in the endless chain of rollers while the latter turns in the hub, as and for the purposes set forth.

2. In a wheel or pulley power mechanism, the combination, with a supporting-frame, of a hub A, bored at $a^4$ and provided with an exterior flange $a$ and peripheral faces $a' a^2$, a wheel A' and pulley $A^2$ on said faces, bolts $A^3$, passed through the wheel, pulley, and flange, an endless chain of rollers placed within the hub, end plates for the hub fixed to the frame, a shaft or axle passed through said end plates and within the endless chain of rollers, set-screws adapted to prevent the shaft from turning, said hub and its end plates having holes $h'$ $e^3$, respectively, and bolts adapted to said holes for binding the hub to the end plates and frame, substantially as described, for the purposes set forth.

3. In a wheel or pulley power mechanism, the combination, with a supporting-frame, a hollow hub, an endless chain of rollers placed therein, a shaft placed within the endless chain of rollers, and power-transmitting wheels or pulleys fitted to the hub, of bored blocks I, plates J, and clamping-bolts, substantially as described, whereby the power-transmitting wheels when removed from the hub may be applied directly upon the shaft or axle of the motor, as and for the purposes set forth.

DAVID C. FRAZEUR.
WILLIAM J. DAVIS.

Witnesses:
 ELIZA J. STORMS,
 ALFRED L. STORMS.